Feb. 16, 1960 R. W. S. KINSEY 2,925,474

AUTOMATIC SWITCHING SYSTEMS

Filed June 14, 1957 4 Sheets-Sheet 3

Feb. 16, 1960 R. W. S. KINSEY 2,925,474

AUTOMATIC SWITCHING SYSTEMS

Filed June 14, 1957 4 Sheets-Sheet 4

United States Patent Office 2,925,474

Patented Feb. 16, 1960

2,925,474

AUTOMATIC SWITCHING SYSTEMS

Ronald William Stanley Kinsey, West Dulwich, London, England, assignor, by mesne assignments, to Siemens Edison Swan Limited, London, England, a company of Great Britain Application June 14, 1957, Serial No. 665,780

Claims priority, application Great Britain June 14, 1956

8 Claims. (Cl. 179—22)

Figure 1:
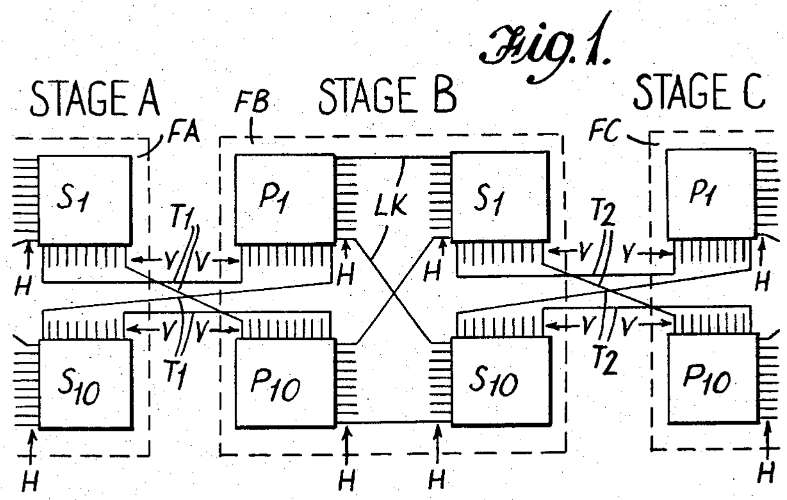

This invention relates to automatic selective switching systems, such as may be employed in automatic telephone exchanges, comprising a number of switching stages each affording selective access between a number of terminal groups at one side of the stage and the same or a different number of terminal groups at the other side, which switching stages, having inter-stage connections terminating respectively on such terminal groups, such connections being hereinafter called trunks in conformity with telephone terminology, are controlled by respective control circuits each of which, in response to receipt of a setting signal identifying a trunk terminating at one side of the appertaining stage and selected other than by the control circuit in question, fulfills the following functions, namely: selects a free trunk terminating at the other side of the stage and extending to the next stage, if any; controls the establishment of a circuit through the stage between the selected trunks at its opposite sides; and effects the transmission to such next stage of a setting signal relative to the selected inter-stage trunk thereto. Such switching systems will hereinafter be referred to as being of the kind specified.

The invention has an important application in and will be described with particular reference to a semi-electronic system employing electromechanical selector switches of the cross-bar type (or equivalent switching arrangements) controlled by devices of an electronic nature such as thermionic or cold-cathode valves or transistors. It is to be understood, however, that the invention is also applicable to fully electronic systems, in which for example the switches are constituted by electronic devices such as cold-cathode valves or transistors, and to other systems employing for instance motor uniselector switches.

Before going on to describe the invention, it is thought to be desirable to indicate in general terms some considerations involved in providing a cross-bar switching stage in an automatic switching system. A cross-bar switch unit, an example of which will be found described in volume 2 at pages 639–640, of the text-book "Telephony," by J. Atkinson, essentially consists in its usual form of an assembly of contact sets (each comprising a number of co-operating fixed and moving contacts) which are arranged matrix-wise in a number of horizontal and vertical rows of which there are usually ten horizontal rows and ten or twenty vertical rows. These contact sets are selectively actuable by the operation of electromagnets provided one for each vertical row ("hold" magnets) and one for each horizontal row ("select" magnets), the operation of a select magnet and a hold magnet, in that order, causing operation of a horizontal selecting member and vertical holding member which together are effective to actuate the contact set at the "cross-point" of the horizontal and vertical rows to which the operated magnets respectively pertain. Contacts corresponding to each other in the several sets in each vertical row, one contact from each co-operating pair, are electrically interconnected to constitute a multi-path vertical multiple providing a number of separate paths equal to the number of contact pairs per set, while of the remaining contacts corresponding contacts from the several sets in each horizontal row are also electrically interconnected to constitute a multi-path horizontal multiple. The arrangement thus provides that any one of a number of terminal groups (for example ten or twenty) connected respectively to the multi-path vertical multiples can be given access to any one of a number of terminal groups (for example ten) connected respectively to the horizontal multiples, it being appreciated that the terminals of each group are connected respectively to the several paths afforded by the multiple to which the group as a whole is connected.

A cross-bar switch may comprise a single cross-bar unit or, if desired, a number of cross-bar units operating in conjunction to cater for a different number of terminal groups, and thus if possible connections thereto, on either side of the switch; for instance ten cross-bar units having ten vertical contact rows each, or five cross-bar units having twenty vertical rows each, providing a hundred vertical multiples in either case, may have their horizontal selecting bars arranged to operate together and the horizontal multipling continued through all the units to provide a composite switch through which each of a hundred terminal groups connected to the vertical multiples has access to ten terminal groups connected to the horizontal multiples.

In an exchange system of the kind above specified any switching stage may therefore comprise a plurality of cross-bar switches together providing access between a number of terminal groups which on one or each side of the stage is greater than could conveniently be catered for by a single switch. Thus for example a switching stage employing single-unit cross-bar switches may comprise ten primary switches having their horizontal multiples cross-linked with those of ten secondary switches, so as, assuming ten vertical multiples per cross-bar unit, to afford selective access between, for example, a hundred trunks connected to the vertical multiples of the primary switches by way of the respective terminal groups and a hundred trunks likewise connected to the vertical multiples of the secondary switches, the term trunk as used herein denoting an inter-stage connection as distinct from a connection, called a link, between switches within one and the same stage. The numbers mentioned may be multiplied by employing for a switching stage a number of what will be termed "frames" each comprising a plurality of primary and secondary switches cross-linked in the frames.

In a switching system of the kind specified employing electronically controlled cross-bar switches, a forward-marked path available for the extension of a call forwards from a calling subscriber's line to a register, likewise a backward-marked path available for the extension of the call towards the called subscriber's line, may at each switching stage involved be appropriated for the call by electronic means included in the control circuit for the stage, which electronic means, in response to a setting signal reverted from stage to stage towards a calling or called subscriber in consequence of the forward or backward marking as the case may be, is effective to record the identities of the inter-stage trunks which are included in said path at the opposite sides of the stage concerned, and also of any intermediate link in the stage, and to control in accordance with the recorded information the setting of the switches of the stage appropriately to establishing a through-connection between said trunks: an exchange system operating broadly on these lines forms the subject of our application No. 472,727.

In the telephone exchange system described in said application, in which each cross-bar switching stage (or link-frame as it is termed therein) comprises a plurality of primary and secondary cross-bar switches cross-linked on their horizontal multiples and having the inter-stage trunks on opposite sides of the stage connected to the vertical multiples, the setting signal received by the control circuit for any switching stage fully identifies a particular trunk at one side of the stage. Considering any particular stage whose control circuit will receive its setting signal from an adjacent switching stage that has selected a free and marked inter-stage trunk, the setting signal therefore identifying this trunk, the control circuit at the stage considered responds to the setting signal to record in a first electronic store the identity of the switch (on one side of the stage) to which that trunk identified by the signal is connected, to record in a second electronic store the position in that switch at which the trunk is connected to select and record in an electronic store the identity of a switch (on the other side of the stage) having a free and marked link between it and said switch on the first side, and to select and record in a fourth electronic store the identity of a free and marked trunk connected to the selected switch on the second side, the control circuit being effective, in accordance with the information stored, to operate the appropriate select and hold magnets for establishing through the relevant cross-bar switches and over said free link a through-connection between the free trunks concerned.

The present invention, which is especially applicable to a telephone exchange system such as that described in our said copending application and when so applied can result in a significant reduction in the amount of equipment required, is based on the realisation that to fulfil its function the control circuit of a multi-switch stage requires to know only the identity of the switch to which an externally selected trunk is connected and that where such trunk is an inter-stage one selected by another switching stage, the identity of the trunk is already known by this latter circuit.

This prior knowledge arises from the fact that in a cross-bar system any trunk between two stages must be connected at its opposite ends to particular horizontal multiples or more usually to particular vertical multiples, in respective switches of the stages; the positions of the multiples concerned in their switches, and likewise the position of the switches in the stages, are not necessarily the same and in fact are usually so chosen as to give each switch in one stage access to all the switches in the other stage through respective inter-stage trunks. For setting up a through-connection over any inter-stage trunk between the two stages it is therefore necessary, inter alia, to effect operation of the cross-bar magnets (select or hold as the case may be) relating respectively to those multiples to which the opposite ends of the inter-stage trunk are connected in the two stages. According to the present invention therefore, in a selective switching system including first and second cross-bar switching stages, the magnets pertaining as indicated above to opposite ends of any particular trunk extending between the first and second stages are electrically coupled so as to be energised contemporaneously by a control circuit for the first stage following selection by the latter of that trunk. A control circuit for the second stage can then be arranged, in response to the setting signal identifying the switch to which the inter-stage trunk is connected, to cause selective energisation in that switch of the transversely operating magnet appropriate to establishing by way of the switch the selected through-connection above referred to: that is, if the inter-stage trunks are connected, say, to the vertical multiples in the second stage then the hold magnets relating to these vertical multiples in the relevant switches will be coupled in the manner indicated for energisation by the first stage control circuit, while the select magnets relating to the horizontal multiples in the same switches are arranged for selective energisation by the second stage control circuit.

In this way the amount of equipment in the control circuit of the second stage can be appreciably reduced since this circuit no longer takes part in storing the identity of the inter-stage trunk. Thus as compared with the electronic control circuit requirements of the exchange system of our said copending application, each control circuit for a second switching stage of an adjacent pair would require one less electronic store and a corresponding reduction in the number of components required for coupling the stores to the cross-bar switch magnets for operating the latter, this being achieved with the addition of a pair of inter-stage trunk wires coupling the magnets pertaining to the opposite ends of the trunk, or possibly, as indicated later, over an existing P-wire in the trunk. Moreover, since the number of switches involved is less than the total number of inter-stage trunks the requirements for signalling on a switch basis in accordance with the invention are less than for signalling on a trunk basis: for instance if there were ten inter-stage trunks leading to each of a hundred switches in a stage, the setting signal would only have to identify one out of a hundred switches as against one out of a thousand trunks.

Figure 3:
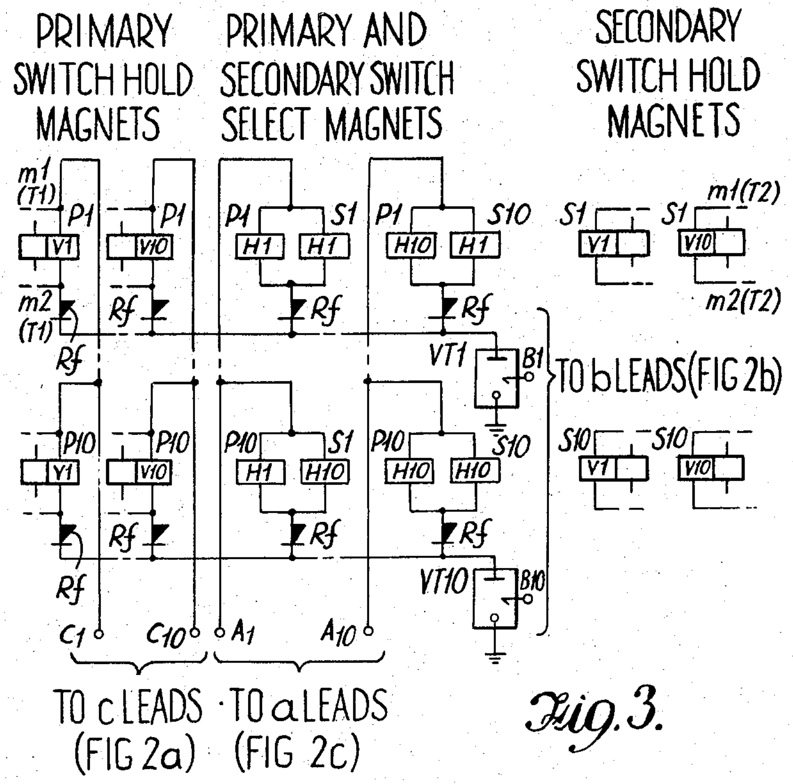
Figure 2A:
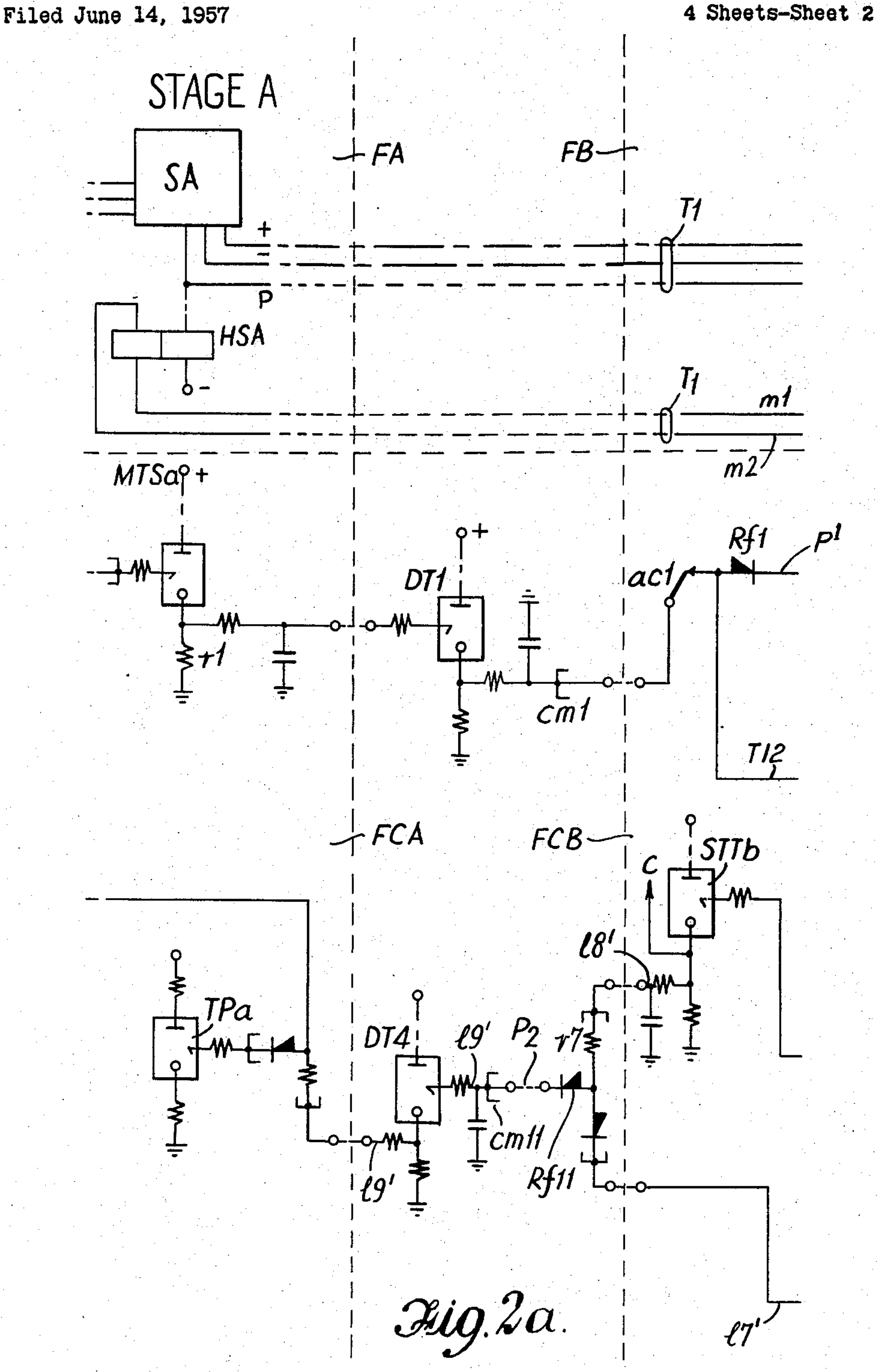
Figure 2B:
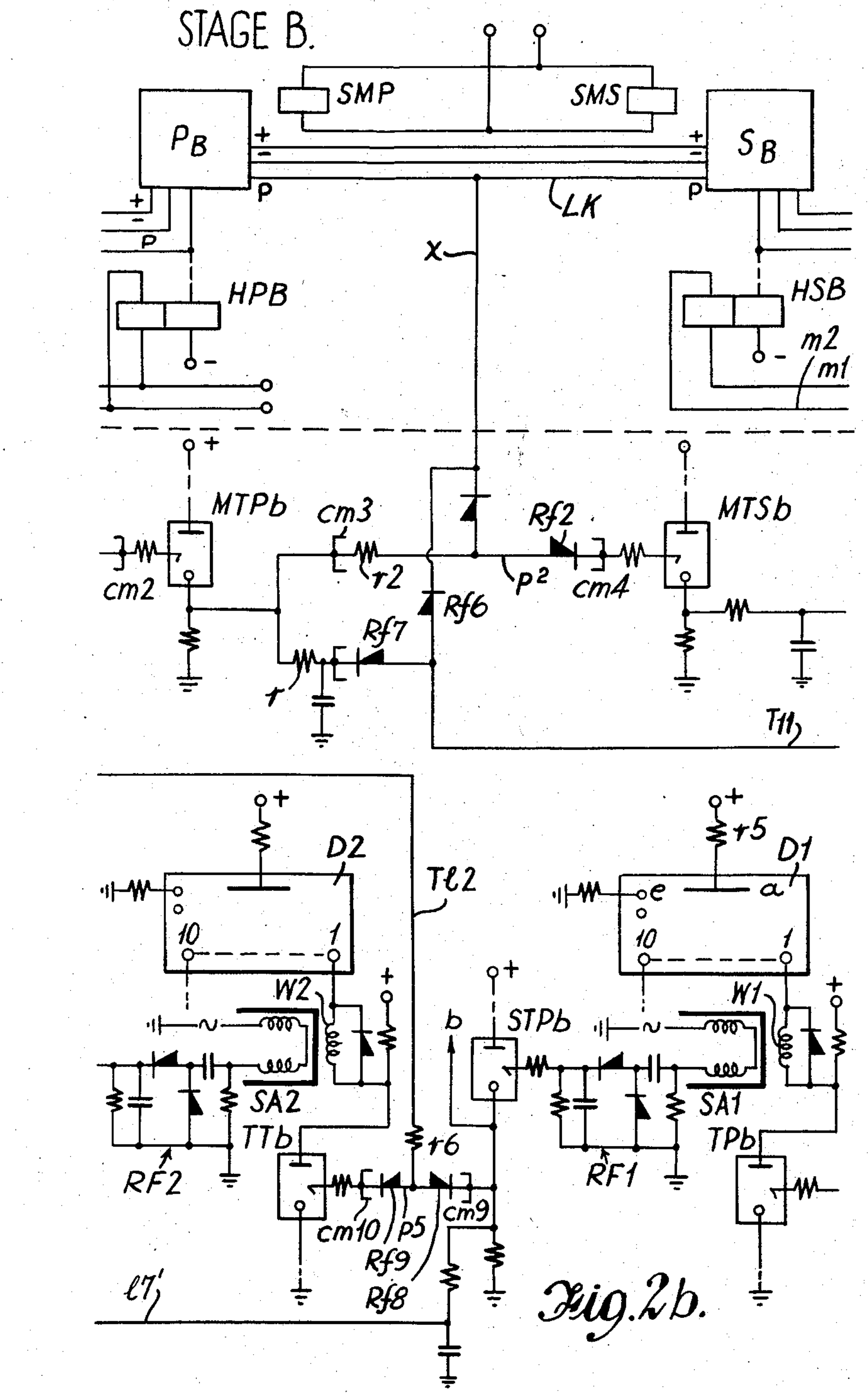
Figure 2C:
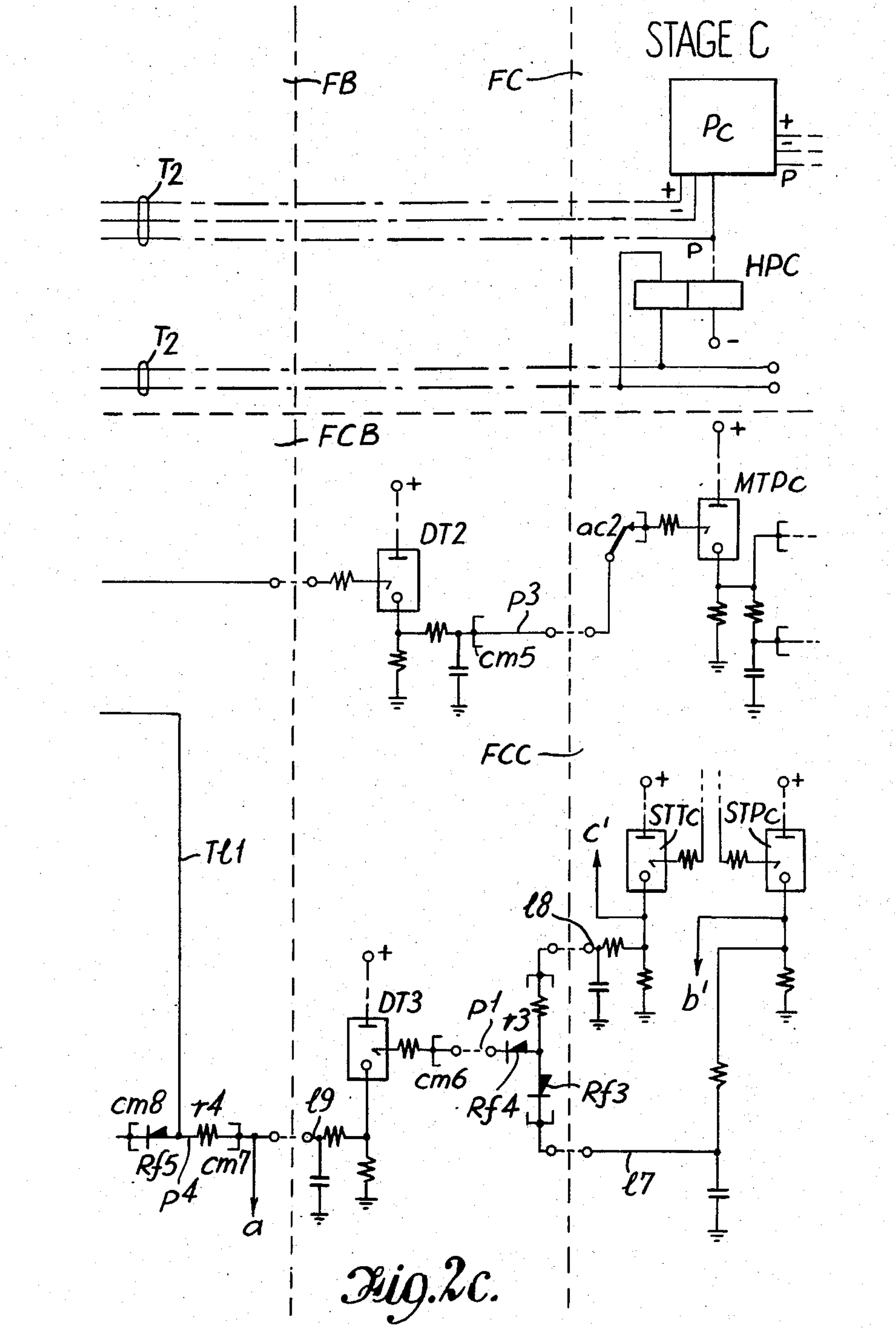

In describing by way of illustrative example a particular embodiment of the invention as applied to an electronically controlled cross-bar exchange, reference will be made to the accompanying drawings in which:

Fig. 1 is an abbreviated schematic trunking diagram illustrating for an intermediate switching stage comprising primary and secondary side cross-bar switches, the cross-linking between these switches on their horizontal multiples and the cross-connection of their vertical multiples with adjacent similar stages on each side;

Figs. 2*a*, 2*b* and 2*c*, when placed together left-to-right in that order, constitute an abbreviated illustration showing the essential features, so far as regards the invention, of the embodiment to be described; and Fig. 3 illustrates the mode of interconnecting the operating magnets of the cross-bar switches.

Referring to Fig. 1 the dotted rectangles FA, FB and FC represent one frame each of respective switching stages A, B and C. The frame FB of stage B comprises ten primary cross-bar switches P1 . . . P10 and ten secondary cross-bar switches S1 . . . S10, only two of the primary switches and two of the secondary switches being represented. The frames FA and FC of stages A and C are each similar to frame FB, only the secondary switches S1 . . . S10 of frame FA and the primary switches P1 . . . P10 of frame FC being represented. Each cross-bar switch is assumed to have ten vertical multiples, represented by the vertical lines V, which in the manner previously described have selective access through the switch with ten horizontal multiples represented by the horizontal lines H. In each frame the horizontal multiples of the primary and secondary switches are cross-linked in such manner that each primary switch P in the frame has a link to each secondary switch S therein. Some typical links are represented at LK for frame FB of stage B. Vertical multiples of the secondary switches S of frame FA of stage A are cross-connected with vertical multiples of the primary switches P of frame FB of stage B, these cross-connections being typically represented at T1. Other vertical multiples of the secondary switches S in frame FA may be likewise cross-connected with vertical multiples in primary switches of other frames (not shown) in stage B. In the same manner, vertical multiples of the secondary switches S of frame FB of stage B are cross-connected, by trunks typified by T2, with vertical multiples of the primary switches in frame FC of stage A and possibly also other frames of this latter stage. Since there are ten switches in each frame and ten vertical multiples per switch there will be a total of a hundred trunks extending from each frame to the adjacent stage. The vertical multiples of the primary switches (not shown) of stage A and of the secondary switches (also not shown) of stage C may have connected to them, dependent on the position and function of these stages in the overall exchange, either trunks leading to other switching stages or connections leading for instance to subscribers' lines. Each frame has its own control circuit, the portions of which relevant to the present invention will now be described with reference to Figs. 2*a*, 2*b* and 2*c* laid together in the manner indicated.

Referring thereto, there is shown in respect of stage B, for one frame of that stage, a representation of one primary switch PB and one secondary switch SB of the frame together with a single link LK extending between horizontal multiples of these switches, each link being assumed to include the so-called (+), (−) and P-wires commonly found in an automatic telephone exchange. The operating (select) magnets associated with the horizontal multiples to which the opposite ends of the link LK are connected in the switches PB and SB respectively are indicated at SMP for the primary switch and SMS for the secondary switch. A single trunk T1 is shown connecting one of the vertical multiples of the switch PB in stage B to one of the vertical multiples of a secondary switch SA in stage A, this trunk being representative of all the trunks (a hundred per frame in total) interconnecting the primary switches PB of stage B with the secondary switches, of which SA is typical, of stage A. The operating (hold) magnets associated with the vertical multiples to which the opposite ends of the trunk T1 are connected, are indicated at HSA and HPB at stages A and B respectively. The trunk T1 includes (+), (−) and P-wires connecting between the switches as indicated, and also two additional wires *m*1 and *m*2 connecting the hold magnets HSA and HPB in parallel. A similar typical trunk T2 is shown connecting one of the vertical multiples of secondary switch SB in stage B with one of the vertical multiples of a primary switch PC of stage C, the hold magnets HSB and HPC relating to these vertical multiples being connected in parallel over the *m* wires in this trunk.

The figures under consideration also illustrate in an abbreviated manner, relevant portions of frame control circuits FCA, FCB and FCC for the represented frames FA, FB and FC of stages A, B and C respectively.

Conforming to the requirements of an exchange such as that described for instance in our said copending application or in our application No. 665,774 it will be assumed that in the operation of an exchange embodying the switching stages A, B and C, a marking signal is extended over the control circuits such as FCA, FCB and FCC of the various stages, indicating in the process what trunks such as T1 and T2 and what links such as LK are free for inclusion of a through-connection through the stages, and that a setting signal reverted over the control circuits from stage to stage controls the selection and establishment of an available through-connection including trunks and links indicated by the marking signal as being free.

The control circuit FCA is shown as including a cold-cathode discharge tube MTS*a* which typifies ten such tubes relating one to each of the ten secondary switches such as SA in frame FA of stage A. The control circuit FCB is shown as including cold-cathode discharge tubes MTP*b* and MTS*b* each typical of ten such tubes respectively relating in the one case to the ten primary switches such as PB in frame FB of stage B and in the other case to the ten secondary switches SB of that frame. The control circuit FCC includes a cold-cathode discharge tube MTP*c* typifying ten such tubes relating one to each of the ten primary switches such as PC in frame FC of stage C. The tubes such as MTS*a* and those such as MTP*c* are assumed to be connected in the same manner as, and therefore to be controlled similarly to, the tubes such as MTS*b*, and those such as MTP*b* respectively.

In a manner analogous to that which will be described later for the tubes such as MTS*b*, the marking signal as extended over the control circuit FCA for frame FA of stage A will fire those of the tubes such as MTS*a* which relate to secondary switches such as SA of this frame having appropriate free links extending to them from the primary side (not shown) of the frame. The marking is thereupon extended towards the frame control circuits for stage B from the cathode of each tube such as MTS*a* thus fired, it being appreciated that the firing of such tube will by reason of its cathode resistor such as *r*1, cause its cathode potential to be raised to a marking value. Assuming tube MTS*a* relating to switch SA is fired and considering the extension of the marking from its cathode, it is required that this marking should indicate which of the ten trunks such as T1 leading to stage B from switch SA is free. Since these trunks lead to particular respective switches such as PB in stage B (these switches not necessarily being in the same frame in this latter stage), the free condition of any trunk can be indicated by firing the tube such as MTP*b* relating to the switch such as PB to which the trunk extends. Marking paths have therefore to be provided from each tube such as MTS*a* to ten tubes such as MTP*b*, and in order to minimise the amount of cabling required between the frame control circuits of the successive stages, tubes such as DT1, one for each tube such as MTS*a*, are provided in physical locations relatively near the stage B and its frame control circuits. A marking at the cathode of a tube such as MTS*a* appears at the trigger electrode of the corresponding tube DT1 and thereby fires this latter tube, causing a marking to appear at its cathode. This marking is extended, over a common *cm*1, to ten paths *p*1 leading to the trigger electrodes of those ten tubes such as MTP*b* which relate as previously indicated to the switches PB having trunks such as T1 extending to them from the switch SA represented by the fired tube such as MTS*a*.

Since each of the switches such as PB has ten trunks such as T1 leading to it from respective switches such as SA in stage A, the trigger electrode of each tube such as MTP*b* will have ten paths such as *p*1 leading to it from different tubes such as DT1, this being indicated by the common *cm*2. The total number of paths such as *p*1, will therefore be equal to the number of trunks such as T1 between stages A and B, each path relating to its own particular trunk.

Each path such as *p*1 includes an isolating rectifier such as R*f*1 and a contact, such as *ac*1, which is an auxiliary contact controlled by the hold magnet such as HPB associated with the vertical multiple to which the trunk represented by the path concerned is connected in a switch such as PB. Each contact such as *ac*1 is normally closed but is open when the magnet controlling it is energised, namely when the switch such as PB with which that magnet is associated has been set to establish a connection through it between the trunk such as T1 and a link such as LK. Thus if a trunk such as T1 is already engaged in an established through-connection, the contact such as *ac*1 in the corresponding path such as *p*1 will be open.

A marking initiated by the firing of any tube such as MTS*a* relating to a particular secondary switch such as SA in stage A, will therefore be extended, by way of a tube such as DT1, over the associated paths such as *p*1 in which the contacts *ac*1 are still closed. This results in the firing of those tubes such as MTP*b* which relate to primary switches such as PB in stage B having free trunks extending to them from the particular secondary switch concerned in stage A.

Considering any tube such as MTP*b* thus fired in the control circuit FCB for frame FB, the tube provides at its cathode a marking which is applied in common, as indicated at *cm*3, to ten paths such as *p*2 leading respectively to the trigger electrode of the ten tubes such as MTS*b* relating to the secondary switches such as SB in that frame. These ten paths respectively correspond to the ten links such as LK which extend to these secondary switches from the primary switch such as PB to which the MTP*b* tube being considered relates. Since each switch such as SB in frame FB has a link extending to it from each primary switch such as PB in the frame, the trigger electrode of each tube such as MTS*b* in the frame control circuit FCB has paths such as *p*2 leading to it from the cathodes of all the tubes such as MTP*b* in that circuit (common *cm*4).

Each of the paths such as *p*2 includes, in series, a resistor such as *r*2 and a rectifier such as R*f*2 the junction point of which is connected via a rectifier in a lead such as *x* to the P-wire in the link such as LK to which the path corresponds. It is assumed that, in conformity with practice, a holding earth is applied over the P-wires of the trunks such as T1 and T2 included in an established through-connection, this holding earth being extended through the switching stages over the P-wires in the frame links such as LK included in the connection. Thus if a link is busy its P-wire will be earthed. Consequently a marking appearing from a fired tube such as MTP*b* on a path such as *p*2 corresponding to a busy link such as LK, will be diverted to earth. The marking applied to a path such as *p*2 corresponding to a free link, however, will be extended over the path to fire the relevant tube such as MTS*b* relating to the secondary switch such as SB to which that link extends.

From the cathode of any tube such as MTS*b* thus fired, a marking is extended, by way of a corresponding tube such as DT2, at the common *cm*5 ten paths such as *p*3 corresponding respectively to those trunks such as T2 which extend between the stage B secondary switch to which the fired MTS*b* tube relates and respective primary switches such as PC in stage C. These paths such as *p*3 lead respectively to the trigger electrodes of the tubes such as MTP*c* relating to the stage C primary switches such as PC to which the corresponding T2 trunks extend, each path including a contact such as *ac*2 which is controlled, in a manner similar to that already described for the contacts such as *ac*1, by the hold magnets associated with the vertical multiples to which the corresponding T2 trunks are connected in the stage C primary switches. The extension of the marking to stage C following the firing of a tube such as MTS*b*, corresponds in all respects to the already described extension of the marking to stage B following the firing of a tube such as MTS*a*.

A marking having been extended through all switching stages to indicate in the manner described all appropriate trunks and links available for inclusion in a through-connection through the stages, a setting signal is reverted in response to which the frame control circuits select and effectively record the identities of certain of these trunks and links for subsequent inclusion in a through-circuit established by appropriately setting the relevant switches in the several stages.

Let it be assumed that in response to the reverted setting signal the frame control circuit FCC for frame FC in stage C has selected, in a manner similar to that which will be described later for the control circuit FCB of stage B, a particular trunk such as T2 which, extending between a secondary switch such as SB in stage B and a primary switch such as PC in stage C, had been indicated by the marking process as being free. By firing one of ten cold-cathode tubes typified by STP*c*, the control circuit FCC records the identity of the primary switch such as PC to which the selected trunk is connected in stage C. It also records, by firing one of ten cold-cathode tubes typified by STT*c*, which one of the ten trunks connected to the recorded switch such as PC is the one selected. The cathodes of the tubes such as STP*c* are respectively connected to ten leads such as *l*7 which relate one to each primary switch in frame FC of stage C. Likewise the cathodes of the tubes such as STT*c* are connected respectively to ten leads such as *l*8 which relate to the different vertical multiples in any primary switch of the frame.

Each of the leads such as *l*7 is paired individually with each of the leads such as *l*8, and each pair is connected through a resistance-rectifier gating circuit such as that constituted by *r*3, R*f*3 and R*f*4 to an individual point such as P1. For each frame of stage C there are therefore a hundred points such as P1: these relate respectively to the hundred trunks leading to stage B from the relevant frame. With a particular primary switch of stage C selected and recorded by the firing of one of the STP*c* tubes, and with a particular trunk connected to that switch selected and recorded by the firing of one of the STT*c* tubes, the consequent rise in potential at the cathodes of the fired tubes becomes applied by the action of the gate pairing these cathodes to mark the particular point such as P1 pertaining to the selected trunk.

Of the points such as P1, all those relating to trunks which lead to the secondary switch such as SB in stage B are connected in common, as indicated at *cm*6, to the trigger electrode of a cold-cathode tube such as DT3, there being one such tube for each secondary switch in stage B. Thus following selection of a particular trunk, the marking applied at the corresponding point such as P1 fires the tube such as DT3 relating to the secondary switch of stage B to which the trunk extends. The marking then appearing at the cathode of the fired DT3 tubes is transmitted as a setting signal to the relevant frame control circuit of stage B over a signalling wire such as *l*9, there being one such wire per secondary switch in stage B.

Assume that at stage B the frame control circuit FCB receives a setting signal over lead *l*9 to indicate that the trunk selected and recorded at stage C leads to switch SB in frame FB of stage B. This setting signal is applied in common, as indicated at *cm*7, to ten paths *p*4 leading to the trigger electrodes of respective cold-cathode tubes typified by the tube TP*b*. As indicated at *cm*8, each of the tubes such as TP*b* has its trigger electrode also connected, over paths similar to *p*4, to the cathodes of the other tubes such as DT3 relating to the other switches such as SB in frame FB of stage B. The paths such as *p*4, each comprising a resistance such as *r*4 in series with a rectifier such as R*f*5, can therefore be considered as representing respectively all the links such as LK between the primary and secondary switches of frame FB.

From the junction of the resistance and rectifier in each path such as *p*4, a test lead T*l*1 extends via a rectifier such as R*f*6 and lead *x* to the P-wire of the related link such as LK. It also extends via a rectifier such as R*f*7 and resistance *r* to the cathode of the tube MTP*b* relating to the primary switch such as PB to which that link is connected. If the link is busy or if the cathode of the MTP*b* tube is unmarked, any marking on the path such as *p*4 in question will be diverted to earth over its test link such as T*l*1. Otherwise such marking will fire the TP*b* tube to which the path extends. Thus of the ten TP*b* tubes in the frame control circuit FCB, those tubes will be fired which relate to primary switches having free and effectively marked links such as LK extending from them to the secondary switch SB identified by the fired DT3 tube as having the selected trunk connected to it.

To select one of the possible plurality of fired TP*b* tubes and thereby select one of the primary switches just referred to, a one-only selection circuit including a Dekatron multi-cathode cold-cathode tube D1 is employed. Briefly this tube D1, which is represented in conventional symbolic form, comprises in an evacuated envelope an anode *a* surrounded by ten circumferentially distributed cathodes 1 . . . 10. The tube is kept "alive" by an auxiliary electrode *e* which is connected to earth and normally has a glow discharge existing between it and the anode *a*. This discharge can, however, be transferred to one of the cathodes 1 . . . 10 by lowering the potential of such cathode sufficiently below that of the auxiliary electrode.

The ten TP*b* tubes in the control circuit FCB for frame FB are respectively associated with the cathodes of the tube D1 by having their anodes connected to the relevant cathodes through the winding such as W1 of a saturable reactor such as SA1, there being one such saturable reactor for each Dekatron cathode. When any TP*b* tube is fired, the resultant drop in its anode potential is therefore transmitted to the associated Dekatron cathode, resulting in this cathode tending to take over the discharge in the tube D1. Should more than one TP*b* tube have been fired, indicating that links such as LK are available to more than one primary switch in the frame, only one of the associated cathodes will take the discharge and the others will be effectively "locked out" in consequence of the resultant voltage drop across the anode resistor *r*5 of the tube D1. There is thus an effective "one-only" selection by which one of the available primary switches is preferentially selected by its associated cathode in the Dekatron taking the discharge.

The particular primary switch thus selected is recorded by the firing of a tube such as STP*b* in consequence of the current flow at the Dekatron cathode then taking the discharge: this current flow passes through the control winding such as W1 of the associated saturable reactor such as SA1, resulting in this reactor producing an output signal which, after rectification in a voltage doubling circuit such as RF1, is applied to the relevant tube STP*b* to fire it. It will be appreciated that there is one such STP*b* tube for each primary switch in the frame FB and that they correspond to the tubes such as STP*c* already referred to in the control circuit FCC for the stage C frame FC.

Having thus in effect selected in stage B a particular primary switch having a free link to the secondary switch to which the selected trunk from stage C is connected, it is now required to select a particular free and marked trunk leading to stage A from that primary switch of stage B. To this end, each of the tubes such as STP*b* has its cathode connected in common, as indicated at *cm*9, over respective paths such as *p*5 to the trigger electrodes of ten tubes such as TT*b* representing respectively the ten trunks leading to stage A from any primary switch of stage B. Each of the TT*b* tubes has its trigger electrode connected over similar paths to the cathodes of the other STP*b* tubes also, as indicated by the common *cm*10, so that there will be a total of a hundred paths such as *p*5 relating respectively to all the trunks extending to stage A from frame FB of stage B.

Each of the paths such as *p*5 comprises two oppositely poled rectifiers such as R*f*8 and R*f*9 in series. From the junction of these rectifiers in each path, a test lead such as T*l*2 extends over a resistor such as *r*6 to the path such as *p*1 relating to the same trunk, being connected to the latter path on the opposite side of the contact such as *ac*1 therein from the tube such as DT1. If the trunk to which a particular *p*5 path relates is free (*ac*1 contacts closed) and if the corresponding *p*1 path has been marked by the firing of a DT1 tube, the relevant test lead such as T*l*2 will take a relatively positive marking potential to the junction of the rectifiers such as R*f*8 and R*f*9 in the *p*5 path in question. If this trunk is one that is connected to the selected primary switch, the STP*b* tube to the cathode of which this latter path is connected will have been fired; the resultant raised potential at its cathode will then back off the rectifier such as R*f*8 to allow the marking on the test lead to be applied over the rectifier such as R*f*9 to the trigger electrode of the TT*b* tube pertinent to the trunk concerned. This latter tube will therefore be fired. For any other free trunks such as T2, namely trunks connected to primary switches of stage B other than the one selected, the STP*b* tubes relating to these primary switches will not have been fired and their cathodes will therefore be near earth potential. Consequently a marking on a related test lead such as T*l*2 would be diverted to earth by way of the rectifier such as R*f*8 in the *p*5 path concerned, thus preventing such marking from firing a TT*b* tube.

Since there may be more than one free trunk available to stage A from the selected primary switch of stage B, more than one of the TT*b* tubes may be fired in the manner indicated. To select a particular one of these trunks, a one-only selection circuit is employed which includes a Dekatron D2 and is similar in constitution and operation to the previously described one-only selection circuit including Dekatron D1. As before, the current flow at the cathode which takes the discharge in Dekatron D2 when a selection action takes place, passes through the control winding such as W2 of a saturable reactor such as SA2 and causes this reactor to produce an output which, after rectification in a voltage doubling circuit such as RF2, fires an associated tube such as STT*b* (which is one of ten) to record which trunk such as T1 has been selected from those connected to the previously selected stage B primary switch such as PB. The tubes such as STT*b* correspond for stage B to those such as STT*c* already referred to for stage C.

The tubes such as STP*b* relating to respective primary switches in frame FB of stage B, and likewise the tubes such as STT*b* relating to respective trunks such as T1 connected to these switches, have leads such as *l*7' and *l*8' respectively, connected to their cathodes. In a manner similar to that previously described for the leads such as *l*7 and *l*8, these leads such as *l*7' and *l*8' are connected in pairs, through resistance-rectifier gates such as that constituted by resistance *r*7 and rectifiers R*f*10 and R*f*11, to individual points such as P2 relating respectively to all the trunks such as T1 leading to stage A from frame FB of stage B. Thus with one of the STP*b* tubes and one of the STT*b* tubes fired, one of the points such as P2 will be marked from the cathodes of these tubes to indicate the particular trunk selected between the stages A and B.

The ten points such as P2 relating to trunks such as T1 leading to the same secondary switch in stage A are connected over a common *cm*11 as before to the trigger electrode of a tube such as DT4 relating individually to that switch. Thus on selection at stage B of a particular trunk such as T1 leading to stage A, one of the tubes such as DT4 will be fired, in the same manner as described for tube DT3, to indicate the particular secondary switch to which that trunk is connected in stage B, a corresponding setting signal being transmitted to the relevant frame control circuit of stage A over a signal lead such as *l*9' connected to the cathode of the fired DT4 tube. At stage A, in response to this setting signal, the frame control circuit such as FCA, including tubes such as TP*a* corresponding to the tubes such as TP*b* at stage B, performs a similar recording and selecting function to that described for stage B.

The tubes such as DT3 and DT4 are preferably located physically near the stages C and B respectively and in addition to acting as storage tubes may then also provide power amplification for driving the setting signals over the leads such as *l*9 and *l*9' to stages B and A respectively.

Once the selection of trunks and links for inclusion in a through-connection has been effected, the through-connection can be established by appropriately setting the relevant primary and secondary cross-bar switches of each frame concerned, on the basis of the information stored by the control circuits. Considering stage B, since each link such as LK extends between particular primary and secondary switches, and since the opposite ends of such link are connected to particular horizontal multiples in these switches, then once a particular link has been selected its subsequent inclusion in the through-connection established through the switching stages can be effected by energising together the operating (select) magnets relating to these horizontal multiples in the two switches. The magnets may therefore be permanently coupled together as exemplified in Fig. 2*b* by the parallel connection of typical select magnets SMP and SMS relating in the manner indicated to opposite ends of the link LK between the switches PB and SB. Likewise since the opposite ends of each trunk such as T1 are respectively connected to particular vertical multiples in a primary switch of stage B and a secondary switch of stage A, the operating (hold) magnets associated with these particular vertical multiples can be coupled together: thus by way of an example typical of all the trunks such as T1, the hold magnets HSA and HPB, relating to the vertical multiples to which the trunk T1 is connected in switches SA and PB, have been shown connected together in parallel. The same applies for each trunk such as T2 between stages P and C, the hold magnets such as HSB and HPC relating to vertical multiples to which opposite ends of such trunk are connected, being likewise connected in parallel as shown.

The identities of the stage B primary and secondary switches between which a selected link such as LK is connected, are recorded by the fired conditions of one of the STP*b* tubes and one of the DT3 tubes respectively as has been previously explained. The information stored by these fired tubes, considered together, therefore identifies the selected link. Consequently for setting the switches to include the selected link in a through-connection, control signals taken from the cathodes of these tubes over leads such as *a* and *b* respectively, can be used to energise the coupled select magnets such as SMP and SMS relating to the selected link.

The identity of a selected trunk such as T1 between stages B and A is recorded by the fired conditions, considered together, of one of the STP*b* tubes and one of the STT*b* tubes as previously indicated. Consequently for setting the switches to include the selected trunk in a through-connection, control signals taken from the cathodes of these tubes over leads such as *b* and *c* respectively can be used to energise the coupled hold magnets such as HPB and HSA relating to the selected trunk. The same applies in respect to a selected trunk such as T2 between stages B and C, in which case the coupled hold magnets such as HSB and HPC relating to the trunk can be energised by control signals taken from cathodes of the fired STP*c* and STT*c* tubes over leads such as *b'* and *c'*.

The select and hold magnets of the switches in any frame may be connected, for control by the signals derived over the leads such as *a*, *b* and *c*, in the manner now to be described for a single frame of stage B with reference to Fig. 3, similar magnet connections being assumed for the switches in other frames and other stages.

Referring to Fig. 3, the illustration is abbreviated by representing only two of the vertical hold magnets V1 and V10 for each of only two of the primary switches P1 and P10 and for each of only two of the secondary switches S1 and S10. Also, the horizontal select magnets pertaining to only four links between the primary and secondary switches have been represented, these links having been respectively assumed to extend between the first horizontals of switches PP1 and S1 (magnet H1 in each switch), between the tenth horizontals of switches P10 and S10 (magnet H10 in each switch), between the first horizontal of switch P1 and the tenth horizontal of switch S10 (magnets H1 and H10 respectively), and between the tenth horizontal of switch P1 and the first horizontal of switch P10 (magnets H10 and H1 respectively); these links therefore conform to the links LK actually illustrated in Fig. 1. Each magnet is represented in Fig. 3 by a correspondingly labelled rectangle at the side of which is appended the switch reference corresponding to the switch to which the magnet belongs.

In Fig. 3 the top row of rectangles includes the hold magnets belonging to primary switch P1 and the coupled horizontal magnets relating to the two links connected to that switch. The bottom row includes the hold magnets belonging to primary switch P10 and the coupled horizontal magnets relating to the two links connected to this latter switch. Considering only these magnets (that is, ignoring for the moment the hold magnets of the secondary switches S1 and S10), those in the top row are connected on one side in common, through isolating rectifiers R*f*, to the anode of an earthed cathode discharge tube VT1 the trigger electrode of which is coupled at terminal B1, over one of the *b* leads (Fig. 2*b*) to the cathode of the STP*b* tube relating to the primary switch P1. Likewise the magnets being considered in the bottom row are connected on one side, also through isolating rectifiers R*f*, to the anode of a similar tube VT10 the trigger electrode of which is coupled at terminal B10, over another of the *b* leads to the cathode of the STP*b* tube relating to the primary switch P10. Magnets similarly associated with each other primary switch are likewise connected via terminals corresponding to B1 and B10 to tubes similar to VT1 and VT10 and having their trigger electrodes appropriately connected to the remaining *b* leads.

The other sides of the vertical magnets V1 in all the primary switches P1 . . . P10 are connected in common to terminal C1 and from there are coupled, over one of the *c* leads (Fig. 2*a*), to the cathode of the STT*b* tube which relates to the particular trunk connections (vertical multiples) to which the V1 magnets relate. Likewise the V10 vertical magnets are commoned to terminal C10 and connected over a *c* lead to the cathode of the relevant STT*b* tube. The other vertical magnets in the primary switches are likewise grouped and connected in each group with the relevant STT*b* tube. Each vertical magnet, being related to one end of a particular trunk, is connected in parallel as previously described, to the vertical magnet which likewise relates, in a secondary switch of stage A, to the other end of the same trunk. This parallel connection is indicated by the lines such as *m*1 and *m*2.

The coupled horizontal select magnets relating to each link extending to the secondary switch S1 are connected in common, on their other sides from the tubes VT1 . . . VT10, to terminal A1 coupled over one of the *a* leads (Fig. 2*c*) to the cathode of the DT3 tube relating to switch S1. Of the horizontal magnets shown, those connected in this way are the magnet H1 of switch P1 coupled with magnet H1 of switch S1, and the magnet H1 of switch P10 coupled with magnet H10 of switch S1. Likewise the remaining horizontal magnets shown, relating to links extending to the secondary switch S10, are connected in common to terminal A10 coupled over another of the *a* leads to the cathode of the DT3 tube pertaining to switch S10. The select magnets similarly related to each other secondary switch are likewise connected, via terminals corresponding to A1 and A10, to the relevant DT3 tube. The hold magnets V1 . . . V10 of the secondary switches S1 . . . S10 are coupled for energisation in parallel with corresponding hold magnets of the primary switches in stage C as previously described, the parallel connection being again indicated by the dotted lines such as *m*1 and *m*2 attached to these magnets in Fig. 3.

The coupling between each *a*, *b* and *c* lead and the corresponding A, B and C terminals includes suitable inhibiting means (not shown) by which a signal appearing on any of these leads on firing of the associated storage tube is prevented from reaching the terminal concerned until the selecting and recording function has been completed in all the switching stages, this being necessary to enable provision to be made for the proper order of operation of the select and hold magnets in each switch concerned. After the control circuits have all been set, at which time one *a* lead, one *b* lead and one *c* lead will be carrying a signal in the frame control circuit FCB (Figs. 2*a*–2*c*) of stage B, the inhibitions are removed and these signals appear at the corresponding A, B and C terminals of Fig. 3. By virtue of the interconnection of the magnets as described in relation to this latter figure, these signals are then combined to energise the select magnets such as SMP and SMS which relate to opposite ends of the selected link such as LK in Fig. 2*b*, and also to energise the hold magnet such as HPB which relates, in the stage B primary switch to which the selected link is connected, to the vertical multiple to which the selected trunk extending to stage A is connected. This action can best be explained by considering as a particular example the mode of operation relating to a particular selected link in stage B and a particular selected trunk from there to stage A, it being appreciated that the example is typical of what would be the mode of operation for other selected links and trunks.

Let it be assumed that the selecting action of frame control circuit FCB (Fig. 2) of stage B has selected for inclusion in the through-connection to be established, a link such as LK connected between the first horizontal multiples of switches P1 and S1 of stage B (the switch S1 having connected to it the trunk such as T2 selected by a frame control circuit of stage C), and a trunk such as T1 connected to the first vertical multiple of switch P1. The identity of the secondary switch S1 concerned is recorded by the fired condition of the relevant one of the DT3 tubes; the identity of the primary switch P1 concerned is recorded by the fired condition of the relevant one of the STP*b* tubes; and the vertical multiple concerned in this primary switch is recorded by the fired condition of the relevant one of the STT*b* tubes. With the inhibition referred to removed, signals are applied from the cathodes of these fired tubes, over the respective *a*, *b* and *c* leads, to terminals A1, B1 and C1 respectively (Fig. 3). These signals take the form of relatively positive potentials due to the raised cathode potentials of the fired tubes. The signals at terminals A1 and C1 provide anode potential for the tube VT1 via the coupled select magnets H1 of switches P1 and S1 and via the hold magnet V1 of switch P1, respectively. The signal at terminal B1 therefore causes tube VT1 to fire and draw energising current through these magnets.

The independent action of a frame control circuit in stage C will energise as previously explained the vertical magnet which relates in switch S1 to the vertical multiple to which the selected trunk is connected. The energised magnets H1 and V1 of switch P1 act in conjunction to close the contacts at the corresponding cross-point in the switch P1 and thereby establish through that switch a connection between the selected link and the selected trunk to stage A. Likewise the energised magnet H1 of switch S1 acts in conjunction with the energised hold magnet in that switch to establish through the switch a connection between the selected link and the selected trunk from stage C. A connection is thereby established through stage B between the selected trunks at opposite sides thereof.

When the switches have been thus set, a holding earth is extended over the P-wires of the interconnected links and trunks. As indicated in Figs. 2*a*–2*c*, this holding earth is applied to holding windings on the hold magnets such as HSA, HPB, HSB and HPC associated with the established through-connection, thereby enabling the control circuits to be released while leaving that connection intact.

As a modification, since the P-wire is extended from stage to stage as each stage is set in succession, it is contemplated that instead of employing separate *m* wires for connecting the coupled hold magnets, the coupling may be effected over the P-wire in the trunk with which the magnets are associated, this being done by connecting the operating winding of each of the two magnets (instead of the holding windings thereof as shown) between the P-wire and an appropriate source of potential so that when earth is applied to the P-wire in consequence for instance of the energised select magnet in a preceding stage closing auxiliary contacts between earth and the P-wire, energising current for the magnets flows between earth and said source. It is also possible that instead of the coupled magnets being connected in parallel as shown, they could be connected in series.

It is to be understood that whereas each of the tubes DT3/4, STP*b*/*c* and STT*b*/*c* in Figs. 2*a*–2*c* has been considered as being typical of a group of such tubes which in each case together constitute an electronic store, the groups thus typified could possibly be replaced by multi-cathode tubes which, since each group comprises ten tubes, could conveniently be Dekatrons. Thus in general it may be said that each electronic store comprises discharge tube means providing an appropriate number of electron discharge paths one or another of which is selectively activated in accordance with the information to be stored.

What I claim is:

1. A selective switching system including first and second cross-bar switching stages of which the first includes at least one and the second includes more than one cross-bar switch comprising interconnectible horizontal and vertical multiples transverse to each other and each having an operating magnet associated therewith, inter-stage trunks connected between multiples in the first and second stages respectively, a control circuit for the first stage capable of selecting a free-inter-stage trunk and arranged to transmit to the second stage a setting signal identifying the particular switch in the latter stage to which the selected trunk is connected, a control circuit for the second stage responsive to receipt of said setting signal to select an available connection through the stage, said through-connection including in the last-mentioned switch a multiple transverse to that to which the selected trunk is connected, means in the control circuit of the first stage for effecting in accordance with the trunk selection the contemporaneous energization of the operating magnets associated respectively with the multiples to which opposite ends of the trunk are connected in the first stage and in said switch of the second stage, these operating magnets being electrically coupled together for such contemporaneous energisation, and means in the control circuit for the second stage for effecting in accordance with the selected through-connection the energisation of the operating magnet associated with the said transverse multiple included in the through-connection.

2. A selective switching system as claimed in claim 1 wherein the inter-stage trunks are connected between multiples of like character in the two stages, the coupled operating magnets respectively associated with the multiples to which the opposite ends of each trunk are connected being in consequence also of like character.

3. A selective switching system including first and second cross-bar switching stages of which the first includes at least one and the second includes more than one cross-bar switch comprising interconnectible horizontal and vertical multiples each having an operating magnet associated therewith, inter-stage trunk connected between vertical multiples in the first and second stages respectively, a control circuit for the first stage capable of selecting a free inter-stage trunk and arranged to transmit to the second stage a setting signal identifying the particular switch in the latter stage to which the selected trunk is connected, a control circuit for the second stage responsive to receipt of said setting signal to select an available connection through the stage, said through-connection including a horizontal multiple in the last-mentioned switch, means in the control circuit for the first stage for effecting in accordance with the trunk selection the contemporaneous energisation of the operating magnets associated respectively with the vertical multiple to which the opposite ends of the trunk are connected in the first stage and in said switch of the second stage, these operating magnets being electrically coupled together for such contemporaneous energisation, and means permitting in the control circuit for the second stage for effecting in accordance with the selected through-connection, the energisation of the operating magnet associated with the said horizontal multiple included in the through-connection.

4. A selective switching system including first and second switching stages constituted by cross-bar switches each having interconnectible horizontal and vertical multiples associated with respective operating magnets, inter-stage trunks connected between vertical multiples in the first and second stages respectively, the second stage comprising a plurality of secondary cross-bar switches to which said trunks are connected and a plurality of primary switches inter-linked with the secondary switches on their horizontal multiples, a control circuit for the first stage capable of selecting a free inter-stage trunk and arranged to transmit to the second stage a setting signal identifying the particular switch in the latter stage to which the selected trunk is connected, a control circuit for the second stage responsive to receipt of said setting signal to select an available connection through the stage, said through-connection including an available link between the last-mentioned switch and one of the primary switches in the second stage, and also an available vertical multiple in that primary switch, means in the control circuit for the first stage for effecting in accordance with the trunk selection the energisation of the operating magnet associated with the vertical multiple to which the trunk is connected in the identified switch in the second stage said operating magnet being electrically coupled to, and thereby contemporaneously energisable with, the operating magnet associated with the vertical multiple to which the other end of the trunk is connected in the first stage, and means in the control circuit for the second stage for effecting in accordance with the through-connection selected thereby in its stage, the energisation of the operating magnets respectively associated with the horizontal multiples to which the link included in said through-connection is connected in the primary and secondary switches and with the vertical multiple also included in the through-connection.

5. A selective switching system as claimed in claim 4 wherein as regards each link between the primary and secondary switches of the second stage the operating magnets associated with the horizontal multiples between which such link is connected are electrically coupled together for contemporaneous energisation.

6. A selective switching system as claimed in claim 1 including an electronic store comprising electronic discharge tube means providing a plurality of discharge paths individually and respectively relating to the switches of said second stage and arranged for selective activation by the control circuit of the first stage in accordance with the particular second stage switch at which a selected inter-stage trunk terminates, together with signal leads associated with the respective discharge paths so as to be marked when the relevant path is activated, said signal leads extending to the control circuit of the second stage to identify said particular second stage switch by the particular signal lead thus marked.

7. A selective switching system as claimed in claim 6 including also a plurality of marking paths relating individually and respectively to possible through-connections in the second stage, means for extending a signal lead marking as a marking over each of said marking paths that relates to an available through-connection by way of the switch to which the selected trunk is connected in the second stage, and one-only selection means responsive to markings thus extended over said paths to select one of them and thereby effectively select a particular available through-connection.

8. A selective switching system as claimed in claim 4 including a first electronic store comprising electronic discharge tube means providing a plurality of discharge paths individually and respectively relating to the switches of said second stage and arranged for selective activation by the control circuit of the first stage in accordance with the particular second stage switch at which a selected inter-stage trunk terminates, signal leads associated with the respective discharge paths so as to be marked when the relevant path is activated, said signal leads extending to the control circuit of the second stage to identify said particular second stage switch by the particular signal lead thus marked, a plurality of marking paths relating individually and respectively to the links between the primary and secondary switches in the second stage, means for effectively extending a signal lead marking as a marking over each of said marking paths that relates to an available link connected to the secondary switch to which the selected trunk is connected, first one-only selection means responsive to markings thus extended over the marking paths to select one of them and thereby effectively select one of the last-mentioned links, a second electronic store for recording the identity of the primary switch to which the selected link is connected, this second store comprising electron discharge tube means providing a plurality of discharge paths individually and respectively relating to the primary switches of the second stage and arranged for selective activation according to the switch identity to be recorded, output leads associated with the discharge paths of the second electronic store so as to be marked when the relevant discharge path is activated, further marking paths relating individually and respectively to the vertical multiples in the primary switches, means for extending an output lead marking as a marking over each of said further marking paths that relates to an available vertical multiple in the primary switch to which the selected link is connected, second one-only selection means responsive to markings thus extended over the further marking paths to select one of them and thereby select a particular one of said vertical multiples, a third electronic store for recording the identity of the selected vertical multiple in its switch, means governed by the first and second stores for effecting energisation of the operating magnets associated with the horizontal multiples between which the selected link is connected, and means governed by the second and third stores for effecting energisation of the operating magnet associated with the selected vertical multiple in the primary switch to which said link is connected.

References Cited in the file of this patent

UNITED STATES PATENTS

| | | |
|---|---|---|
| 2,761,012 | Murray | Aug. 28, 1956 |
| 2,777,015 | Jacobaeus et al. | Jan. 8, 1957 |
| 2,813,929 | Oberman | Nov. 19, 1957 |